United States Patent
Nolting et al.

(10) Patent No.: US 9,254,985 B2
(45) Date of Patent: Feb. 9, 2016

(54) ELEVATOR SYSTEM BELT HAVING CONNECTING DEVICES ATTACHED THERETO

(75) Inventors: Reinhard Nolting, Detmold (DE); Marc S. Dickinson, East Boston, MA (US); Mark F. Orelup, Torrington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 578 days.

(21) Appl. No.: 13/577,958

(22) PCT Filed: Feb. 10, 2010

(86) PCT No.: PCT/IB2010/000255
§ 371 (c)(1),
(2), (4) Date: Oct. 24, 2012

(87) PCT Pub. No.: WO2011/098847
PCT Pub. Date: Aug. 18, 2011

(65) Prior Publication Data
US 2013/0062146 A1 Mar. 14, 2013

(51) Int. Cl.
*B66B 7/06* (2006.01)
*H01R 43/00* (2006.01)
(Continued)

(52) U.S. Cl.
CPC ............... *B66B 7/062* (2013.01); *B66B 7/085* (2013.01); *H02G 11/006* (2013.01); *Y10T 29/49194* (2015.01)

(58) Field of Classification Search
CPC ........ B66B 7/085; B66B 7/062; B66B 7/1207
USPC ........... 187/251, 254, 411, 255, 54, 266, 391, 187/413
See application file for complete search history.

(56) References Cited

U.S. PATENT DOCUMENTS

| 7,540,359 B2 * | 6/2009 | Veronesi et al. ............... 187/413 |
| 2003/0092524 A1 | 5/2003 | Baranda et al. |

(Continued)

FOREIGN PATENT DOCUMENTS

| CN | 1926050 A | 3/2007 |
| JP | 56062379 U | 5/1981 |

(Continued)

OTHER PUBLICATIONS

Chinese Search Report for application CN201080063441.6, dated Feb. 13, 2014, 2 pages.
International Search Report for International Application No. PCT/IB2010/000255, Oct. 20, 2010, 2 pages.

*Primary Examiner* — William E Dondero
*Assistant Examiner* — Diem Tran
(74) *Attorney, Agent, or Firm* — Cantor Colburn LLP

(57) ABSTRACT

An assembly comprising (a) a belt, which includes a plurality of wire cords extending lengthwise of the belt with spaces therebetween, and includes a coating of the cords extending into the spaces between the cords, said belt being configured for use in an elevator system as a suspension belt for a car and a counterweight, or being configured for use in an elevator system as a drive belt for a car or for a counterweight, or being configured for use in an elevator system as a combined suspension and drive belt for a car and a counterweight; (b) a first connecting device including a first number of cord contacting elements providing electrical connections contacting element-to-cord; and (c) a second connecting device, including a second number of cord contacting elements providing electrical connections contacting element-to-cord, and including at least two conductive elements, each being electrically connected to a respective one of the cord contacting elements, the conductive elements being provided for making electrical connections to a belt monitoring unit which monitors the proper condition of the cords on the basis of electrical signals passed through the cords; (d) wherein at least one of the first and second connecting devices includes at least one bridge type cord contacting element, which extends into the gap between two cords and provides electrical connection to both cords, thereby electrically connecting the two cords.

14 Claims, 6 Drawing Sheets

(51) Int. Cl.
*B66B 7/08* (2006.01)
*H02G 11/00* (2006.01)

(56) References Cited

U.S. PATENT DOCUMENTS

2008/0190709 A1* 8/2008 Hawkes et al. ............... 187/392
2010/0159737 A1* 6/2010 Elsaesser et al. ............. 439/416
2011/0220438 A1* 9/2011 Annen et al. .................. 187/251

FOREIGN PATENT DOCUMENTS

| JP | 01043078 U | 3/1989 |
| JP | 11083765 A | 3/1999 |
| JP | 2003164536 A | 6/2003 |
| WO | 2005094248 A2 | 10/2005 |
| WO | 2005094249 A2 | 10/2005 |

* cited by examiner ial resistance of the cords could be monitored for changes.
ELEVATOR SYSTEM BELT HAVING CONNECTING DEVICES ATTACHED THERETO The invention relates to an assembly comprising a belt, configured for use in an elevator system as a suspension belt for a car and a counterweight, or configured for use in an elevator system as a drive belt for a car or for a counterweight, or configured for use in an elevator system as a combined suspension and drive belt for a car and a counterweight, and at least one connecting device attached to the belt.

Modern elevator systems are in many cases equipped with belts having wire cords incorporated therein in a coating (rather than uncoated round ropes made of wires), which suspend or drive or suspend and drive an elevator car and a counterweight. If the belt has a drive function, i.e. transmits the forces required to move car and counterweight up and down, the design of the elevator system is frequently such that the belt runs over a drive sheave.

During operation of an elevator system, the wires within a respective cord make slight movements relative to each other, in particular where the belt runs over a sheave or over a deflection roller, whereby it is bent and thereafter stretched again into a straight line configuration. Over long periods of operation time, the relative movements of the wires result in a type of wear that is designated as fretting. Furthermore, individual wires can break due to fatigue after long periods of operation time, especially when they are weakened by fretting.

The manufacturers of elevator systems install belts which have to meet strict specifications as to the maximum tensional force they can transmit without risk of failure. The cords have a rated ultimate tensile strength, and typically the allowed maximum load is specified as ultimate tensile strength divided by a safety factor of typically 12 or 16. Due to the high safety factor, the belts are far away from any risk of failure, even if a certain amount of fretting has taken place, or a certain percentage of the wires in the cords or even if one of the plurality of cords in the belt have ruptured after use of the belt for a considerable time. Nonetheless, belts suffering from more than a tolerable amount of fretting or having more than a permitted percentage ruptured wires in the cords should be replaced by new belts.

It is known to monitor belts in elevator systems for deterioration of mechanical strength, in particular resulting from fretting on the wires and/or broken wires. A common way of monitoring comprises transmitting an electrical signal (pulse or pulses; or current flowing for a longer period of time) through the cords and determining and analysing the transmitted signal. For example the amplitude or other changes of the transmitted signal as compared to the original signal or to a reference signal stored in a belt monitoring unit, is an indication of a change in the cords. As an example, the electrical resistance of the cords could be monitored for changes.

It is known to attach one or more connecting devices to the belt, the respective connecting device comprising cord contacting elements that provide an electrical connection between the respective contacting element and a cord in the belt. Based on such an electrical connection, it is for example possible to input or output electrical signals to or from the respective cord. Depending on the design of the connecting device and the way of monitoring the belt, it is further known to provide an external lead connection between two cord contacting elements, so that it is possible to short-circuit two cords.

Known assemblies of belt and connecting device comprise a connecting device which includes a first portion, a second portion, and screws clamping the two portions together with a section of the belt therebetween (WO 2005/094248 A2, WO 2005/094249 A2). The cord contacting elements are pins with acute tips positioned at locations facing the central portion of the respective cords, when the belt section is properly placed in the connecting device. By turning the screws the two portions of the connecting device are moved to get closer to each other, whereby the actuate tips of the cord contacting elements pierce through the coating of the belt and into the centre portions (with respect to the widths) of the respective cords. Relatively high forces are required to urge the tips of all respective cord contacting elements into place all at the same time. Providing leads for connecting two cord contacting elements to short-circuit two cords, makes the connecting device complicated.

One subject-matter of the invention is an assembly comprising (a) a belt, which includes a plurality of wire cords extending lengthwise of the belt with spaces therebetween, and includes a coating of the cords extending into the spaces between the cords, said belt being configured for use in an elevator system as a suspension belt for a car and a counterweight, or being configured for use in an elevator system as a drive belt for a car or for a counterweight, or being configured for use in an elevator system as a combined suspension and drive belt for a car and a counterweight;

(b) a first connecting device including a first number of cord contacting elements providing electrical connections contacting element-to-cord; and (c) a second connecting device, including a second number of cord contacting elements providing electrical connections contacting element-to-cord, and including at least two conductive elements, each being electrically connected to a respective one of the cord contacting elements, the conductive elements being provided for making electrical connections to a belt monitoring unit which monitors the proper condition of the cords on the basis of electrical signals passed through the cords;

(d) wherein at least one of the first and second connecting devices includes at least one bridge type cord contacting element, which extends into the gap between two cords and provides electrical connection to both cords, thereby electrically connecting the two cords.

Another subject-matter of the invention is a method of mounting a connecting device to a belt, which includes a plurality of wire cords extending lengthwise of the belt with spaces therebetween and includes a coating of the cords extending into the spaces between the cords, said belt being configured for use in an elevator system as a suspension belt for a car and a counterweight, or being configured for use in an elevator system as a drive belt for a car or for a counterweight, or being configured for use in an elevator system as a combined suspension and drive belt for a car and a counterweight;

wherein said connecting device includes a slot that either extends as an open passage through the connecting device, or has, in one end portion thereof, a stop portion for the belt associated to the slot;

and wherein said connecting device includes at least one bore and one screw engaging a wall of the bore, the bore having an axis that traverses the slot;

said method comprising placing a section of said belt in said slot and turning said at least one screw, whereby a portion of the screw is urged into one of the spaces between two cords into contact with the two cords, thereby providing an electrical connection between the two cords.

The invention provides a connecting device, designed for use attached to the belt of an elevator system, which can be mounted to the belt more readily than the above-described prior art connecting devices.

The invention further provides a connecting device, designed for use attached to the belt of an elevator system, which produces in a simple way a well-defined electrical connection between the respective cord contacting element and a cord.

The invention further provides a connecting device, designed for use attached to the belt of an elevator system, which facilitates establishing a short-circuit connection between two cords in the belts.

The invention will be further elucidated by means of non-limiting embodiments and by means of drawings showing those embodiments.

Figure 1:
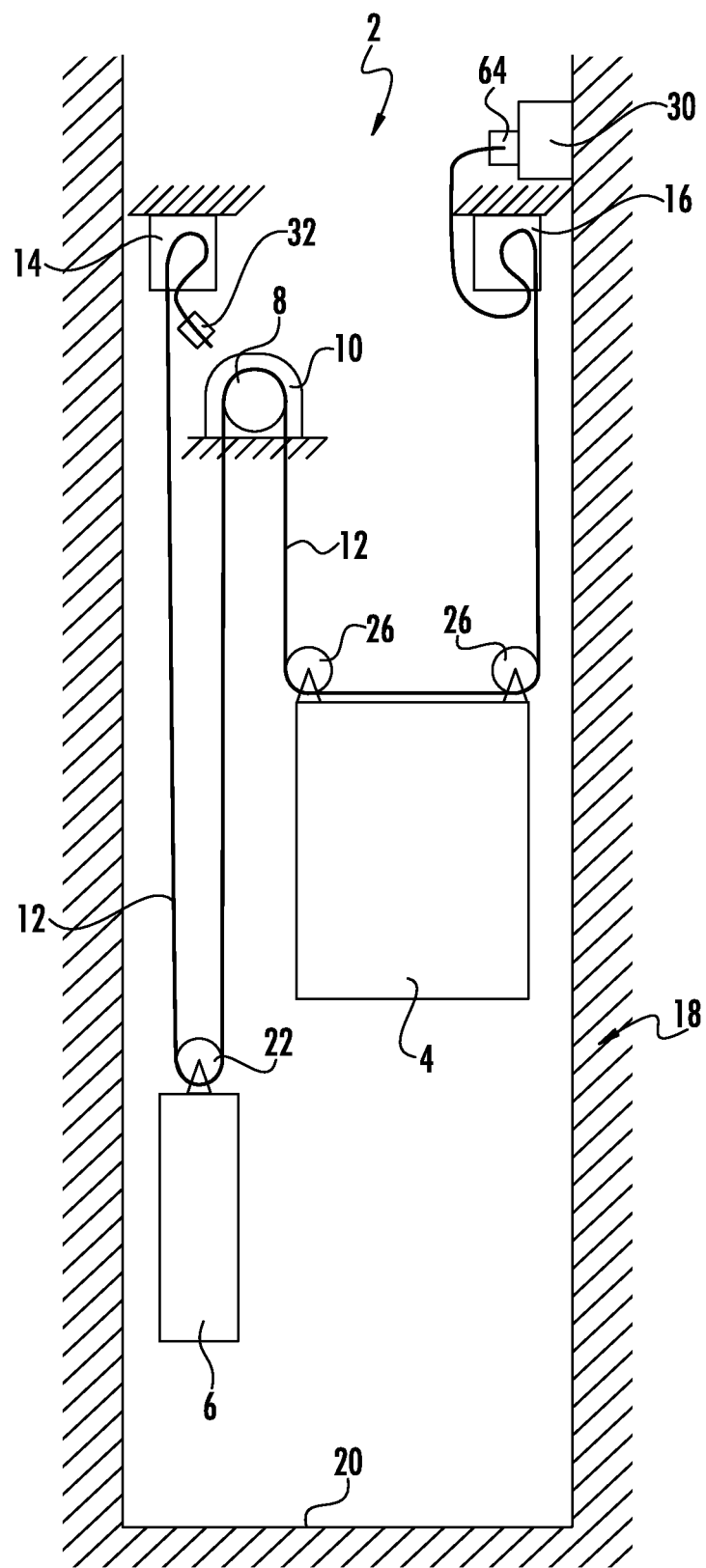
FIG. 1 is an elevation view and illustrates schematically an elevator system in an elevator shaft.

FIG. 1 shows the following mechanical main components of an elevator system 2: passenger car 4, counterweight 6, drive sheave 8 driven by an electric drive motor 10 (located behind the plane of the drawing), and one belt 12 of a plurality of belts (typically two or three or four belts) which are located in a parallel relationship one behind the other (with some distance therebetween) when progressing in a direction perpendicular to the drawing plane. In a first end section of the respective belt 12, the belt 12 is fixed to a first termination device 14. In a second end section the respective belt 12 is fixed to a second termination device 16. In one embodiment, the termination devices 14 and 16 are of a wedge clamp construction as it is known in the art.

A further mechanical component of the elevator system 2 or a first pair of guide rails for the passenger car 4, and a second pair of guide rails for the counterweight 6, as it is well-known in the art. In order not to decrease the clarity of FIG. 1, those guide rails are not shown in FIG. 1. The entire elevator system 2 is positioned within an elevator shaft 18 which typically has a rectangular, horizontal cross-section and is located within a building. In one embodiment, the not-shown guide rails rest, with their lower ends, on a floor 20 of the pit of the elevator shaft 18 and each are connected with clamps (not shown), mutually spaced, to the respective walls of the elevator shaft 18, in order to prevent the guide rails from buckling. The electric motor 10 with, for example, the drive sheaves 8 mounted on the motor shaft or being formed by the motor shaft, rests directly or indirectly on one or a plurality of the guide rails. In another embodiment, the motor 10 is mounted to at least one wall or to a ceiling of the elevator shaft 18. What has just been stated with respect to the mounting of the motor 10, equally applies to the mounting of the termination devices 14 and 16. It is stressed that, in further embodiments, the elevator system 2 is not positioned in a surrounding elevator shaft 18, but of the panorama elevator type, and/or the elevator system 2 is an elevator system for load transportation, rather than for passenger transportation.

The belt 12 shown in FIG. 1 leads down from the first termination device 14 to a deflection roller 22 mounted to the counterweight 6, then leads up to the respective drive sheave 8, then leads down a first deflection roller 24 mounted to the passenger car 4, then leads horizontally to a second deflection roller 26 mounted to the passenger car 4, and finally leads up to the second termination device 16. The same applies to the second (if provided) and third (if provided) and the fourth (if provided) etc. belt 12, each belt 12 having "its own" first termination device 14, deflection roller 22, drive sheave 8, deflection roller 24, deflection roller 26, and second termination device 16. It is stressed, however, that there are other embodiments where a unitary rotating element serves the same function as multiple adjacent drive sheaves, for example in the way that a portion of the shaft of the motor 10 forms two or three or four drive sheave portions one next to the other with a suitable distance therebetween.

FIG. 1 further shows a belt monitoring unit 30, mounted directly or indirectly to a wall of the elevator shaft 18 or to one or more guide rails. Furthermore, FIG. 1 shows a connecting device 32 of the type "first connecting device" and a further connecting device 64 of the type "second connecting device". Both connecting devices 32 and 64 are attached to the belt 12 in those portions of the respective belt end section, which are rearward from the respective termination device 14 or 16, i.e. those portions which are not under the tensional force for suspending the passenger car 4 and the counterweight 6.

The described type of suspending the car 4 and the counterweight 6 is known in the art and called 2.1 suspension. It is stressed that the invention may be practised in combination with all known types of suspension.

FIGS. 2 to 5 show the first connecting device 32 as attached to a portion of the belt 12. The belt 12 either ends at a distance from that front end 36 of the first connecting device 32, which faces the viewer to FIG. 2, or ends within the first connecting device 32 between said front end 36 and the screws 50 to be described below. The belt 12 comes out from the opposite back end 38 of the first connecting device 32 and is then cut at 40 for the purpose of preparing the drawing of FIG. 2. FIG. 1 shows that, in reality, the belt 12 continues into the first termination device 14 and thereafter for its further path as described hereinbefore.

In the illustrated embodiment, the belt includes ten cords 42, designated with the letters a, b, c, d, e, f, g, h, i, k. Each cord 42 includes a central strand and six strands twisted around the centre strand. Each strand consists of a centre wire and six wires twisted around the centre wire. The wires are drawn wires made of high strength steel. Typical dimensions are 1.5 to 3.5 mm cord diameter and 0.12 to 0.4 mm wire diameter in the shown embodiment. Each time between two adjacent cords 42, there are gaps 44 of a size somewhat smaller than the cord diameter. In alternative embodiments, the gaps 44 are larger than the cord diameter or have a width equal to the cord diameter. The cords 42 are embedded in a coating material 46, typically synthetic rubber or polyurethane, which also fills the gaps 44 between cords 42. What has been stated in the present paragraph referred to the illustrated embodiment. Other embodiments of the invention have cords of other designs and/or other sizes of its components and/or other materials and/or a different number of cords 42. Typically, the belt 12 has an ultimate tensile strength in the range of 30 to 100 kN. In a further embodiment of the invention, the belt 12 does not have two planar surfaces (an upper planar surface 48 may be seen in FIG. 2), but a number of longitudinal ribs provided in parallel at one of those surfaces. In this case, the wall of the first connecting device 32, which is in contact with the ribbed side of the belt 12, is provided with longitudinally extending grooves to accommodate the ribs.

Figure 2:
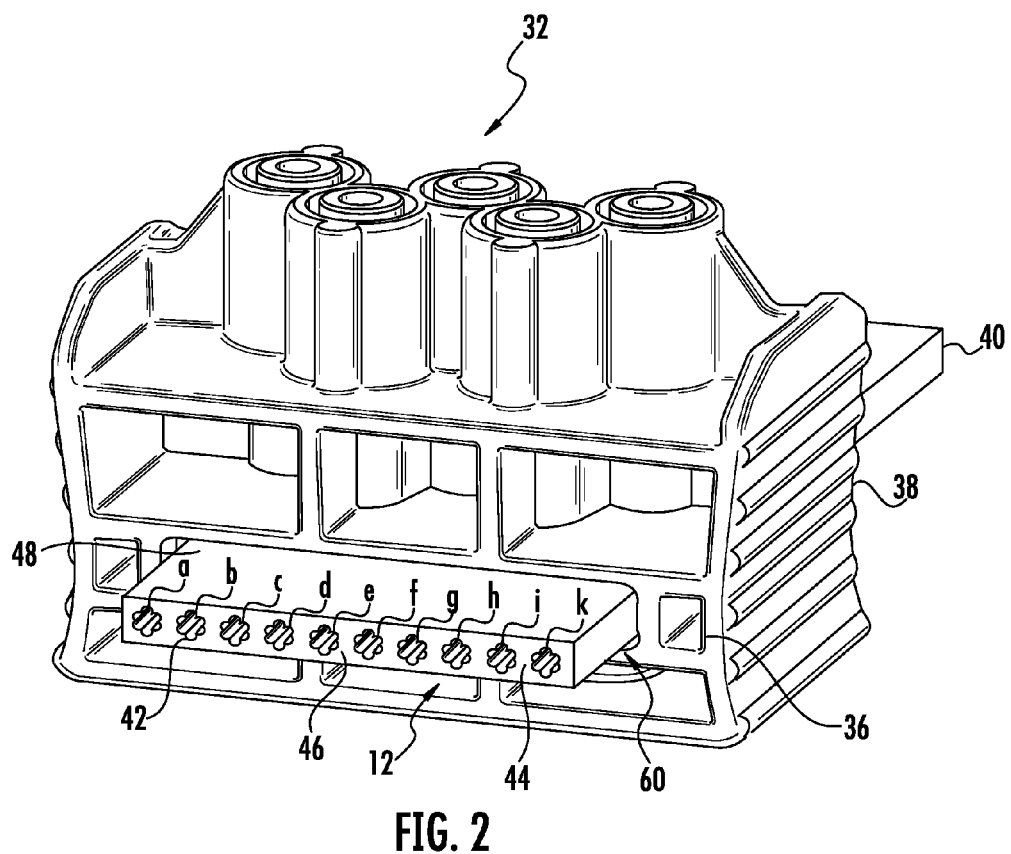
FIG. 2 is a perspective view and illustrates a connecting device of a type designated "first connecting device" in the present application.
Figure 3:
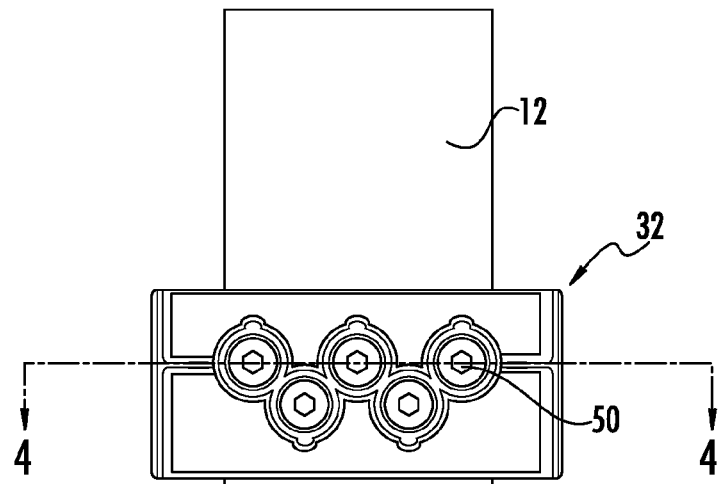
FIG. 3 is a plan view of the connecting device shown in FIG. 2.
Figure 4:
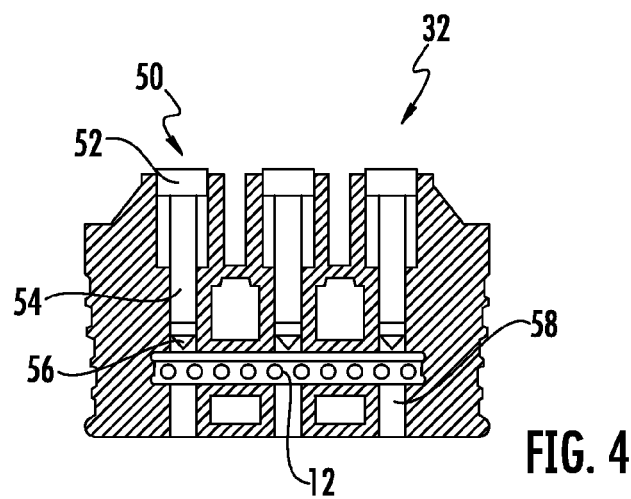
FIG. 4 is a sectional view, taken along the line IV-IV in FIG. 3.
Figure 5:
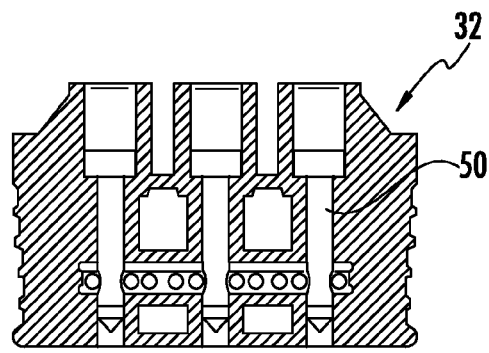
FIG. 5 is a sectional view taken along the line IV-IV in FIG. 3, and illustrates a situation where cord contacting elements have been brought into in-use positions.

As best be seen in FIGS. 2 and 3, the first connecting device 32 includes five cord contacting elements 50, which are screws, each time with a screw head 52, a shank 54, and a conical tip 56. Each screw 50 co-operates with a respective bore 58 in the first connecting device 32, the bore comprising a first section (having a larger diameter than the second and third sections), a second section above the belt 12 (having a slightly smaller diameter than the screw 50), and a third section below the belt 12 (having the same diameter as the second section). In the situation shown in FIG. 4 (screws 50 partly screwed into the first connecting device 32), a lower part of the shank 54 of the respective screw 50 is positioned in the second section of the bore 58, whereas the remainder of the shank 54 and the major part of the screw head 52 are positioned in the first section of the bore 58. Each bore 58, including its first section having a larger diameter, extends through the first connecting device 32 from its upper side to its lower side (considering the orientation of the first connecting device 32 shown in FIG. 2). A slot 60 extends horizontally (in the orientation shown in FIG. 2) through the first connecting device 32 from its front end 36 to its back end 38. The slot 60 has a shape and a size such that it accommodates the belt 12 with some, but not much clearance. In the present embodiment as illustrated in FIGS. 2 to 5, the screws 50, when screwed into the respective bore 58 from the initial position of FIG. 4 to the final position of FIG. 5, each time act as short circuiting (making a direct electrical connection) between two adjacent cords 42. As best seen in FIG. 4 in combination with FIGS. 2 and 3, the screws 5 make direct electrical connections between the cords a and b, c and d, e and f, g and h, and i and k. Bringing each of the screws 50 into its lowermost, in-use position (shown in FIG. 5) is an easy operation not requiring a big effort, because the acuate tip 56 of the screw is readily urged into the gap between the respective two adjacent cords 42, the more so as each "short circuit bridge" is individually brought into its in-use position (shown in FIG. 5), rather than all five cord contacting elements at the same time by turning two screws acting on a clamp type upper part of the connecting device.

The said first section of each bore 58 may serve to hold an end portion of a screw driver, used to turn the screws 50, in place to avoid unintentional slipping out from the bore 58.

Except for the screws 50, the first connecting device 32 is a unitary element produced from plastics material by injection moulding. In the state after injection moulding, the bores 58 do not have female screw threads in their walls. Rather, each time the shank 54, provided with male screw threads, of the respective screw 50 urges/deforms the plastics material into a female screw thread configuration, when screwed into the second section of the respective bore 58 from the beginning to the half-way down position shown in FIG. 4.

Each time the shank 54 of the respective screw 50 has a diameter that is sufficiently larger than the gap between two adjacent cords 42. This ensures that the shank 54 actually makes direct electrical contact to the two cords 42. The tip portion 56 may have or may not have male screw threads. In the same way as it has been described for the second section of the respective bore 58, each time the shank 54 of the respective screw 50 "screws itself" into the third section below the belt 12 of the respective bore 58, cf. FIG. 5. In this situation, the respective shank 54 with its male screw threads has been worked in-between the respective two cords 42, thereby making sure that the coating material 46 has been removed there and perfect electrical contact is established. Thus, the five screws 50 are bridge type cord contacting elements. In the in-use end position shown in FIG. 5, the lower surface of the respective screw head 52 rests against a shoulder 60 of the respective bore 58.

FIGS. 2 and 3 show that the screws 50 and the bores 58 are not arranged in a straight line, but in an offset arrangement in two lines. This results in a very compact arrangement.

Reference is now made to the connecting device 64 illustrated in FIGS. 6 to 9, which is of the type designated "second connecting device" in the present application. The differences of the second connecting device 64 as compared to the first connecting device 32 shall be described first:

A first difference is that the second connecting device 64 does not have an "open" slot extending from one end to the other end of the connecting device, as it has been the case with the slot 60 in the first connecting device 32. Rather, there is a box-shaped deep recess 66 which ends at an end wall 68, the inner face of which is shown by a phantom line in FIG. 7. Apart from the end wall 68, the recess 66 has a cross-sectional shape and size which are similar to the slot 60. When the second connecting device 64 has been attached to the belt 12, a final portion of the belt is positioned in the recess 66, with the end face of the belt 12 abutting against the end wall 68. The recess 66 accommodates the final portion of the belt 12 with a small clearance. The end wall 68 acts as a stop portion of the second connecting device 64, and it is not required for its function that the stop portion closes the slot 60 completely. In an alternative embodiment, the slot 60 extends as an open passage completely through the second connecting device 64, the same way as shown and described in connection with the first connecting device 32.

As a second difference, the second connecting device 64 includes six bores 58 and six cord contacting elements in the form of screws. Four of those screws have been given the reference numeral 50 as in the first connecting device 32. Those screws 50 have an analogous function as in the first connecting device 32, i.e. they provide short-circuiting (make direct electrical connections) between the cords i and h, g and f, e and d, and c and b. Those screws 50 are screwed into the gaps between the respective two adjacent cords 42 in the same way as in the first connecting device 32 (but short-circuiting other "pairs" of cords 42!). Thus, those four screws 50 are bridge type cord contacting elements.

Figure 8:
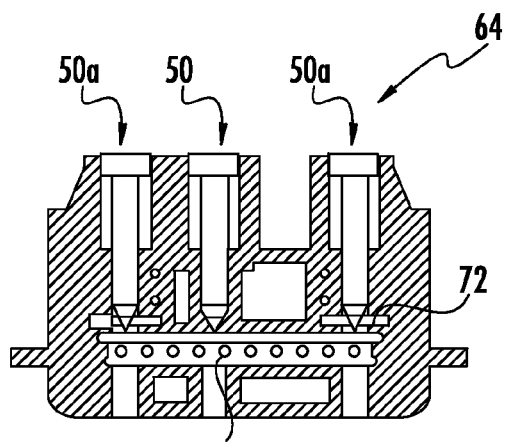
FIG. 8 is a sectional view, taken along the line VIII-VIII in FIG. 7.
Figure 9:
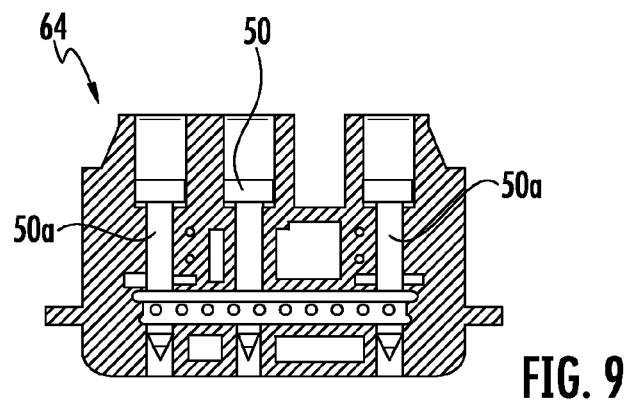
FIG. 9 is a sectional view taken along the line VIII-VIII in FIG. 7, and illustrates a situation where cord contacting elements have been brought into in-use positions.

As a third difference, the second connecting device 64 includes two screws 50a, which are positioned in the second connecting device 64 such that the axis of one screw 50a intersects substantially the centre line of the cord a (which is the cord closest to a first side edge of the belt 12), and that the axis of the other screw 50a substantially intersects the centre line. of the cord k (which is the cord closest to the other side edge of the belt 12). Thus, once these screws 50a, starting from the situation shown in FIG. 8, are screwed deeper into the second connecting device 64, each time they penetrate or pierce the cords a and k respectively. FIG. 9 shows the final, fully screwed-in position of the screws 50a, where a lower end portion of the respective shank 54 has been screwed into the third section of the respective bore 58 below the belt 12. Thus, each screw 50a provides an electrical connection to only one of the cords a and k. The screws 50a have the same design as the previously described screws 50, but due to their specific positions in the second connecting device 64 they have a function, as described, which is different from the function of the other screws 50. In an alternative embodiment, at least one of the screws 50a has its axis offset from the centre line of the cord 42, at a position between such centre line and the side of the cord 42 closer to the edge of the belt 12.

As a fourth difference, the two screws 50a and one screw 50 are arranged in one line extending perpendicularly to the longitudinal direction of the belt 12; two other screws 50 are arranged in a second line, extending parallel to the first described line in a certain distance; the fourth screw 50 is positioned halfway between those two lines.

As a fifth difference, the second connecting device 64 includes two conductive elements 70, each having a first portion 72 accommodated in a respective recess, and a bifurcated second portion 74 protruding from a back end face 76 of the second connecting device 64. The back end face 76 is opposite to the front end face 78 where the belt 12 has been inserted into the recess 66. Each second portion 74 is surrounded by a protection wall 75 that has a rectangular configuration in cross-section.

Apart from the described differences, the second connecting device 64 is of a construction quite similar to the first connecting device 32. It is worth mentioning though, that the second connecting device 64 is somewhat larger than the first connecting device 32 (measured in the longitudinal direction of the belt 12) and that the second connecting device 64 has two protruding ribs 80, one protruding from one side face and the other one protruding from the other side face 82 of the second connecting device 64. Both ribs 80 lie in a common plane, which, in the present embodiment substantially coincides with the plane of the belt 12.

Each screw 50a penetrates through a respective round opening in the first portion 72 of the respective conductive element 70. In the state as manufactured, the respective opening has a smaller diameter than the shank 54 of the respective screw 50a. When the screw 50a is screwed, with part of its length, through the respective opening, a female screw thread is formed in the wall of the opening, whereby a perfect electrical connection between the conductive element 70 and the screw 50a is established. The conductive elements 70 are stamped out from plate-shaped metal.

As FIGS. 2 to 9 show, the axes of all bores 58 and of all screws 50 and 50a are perpendicular to the plane (to be understood as a plane laid through the belt 12 halfway between the upper surface and the lower surface thereof) of the belt 12. In another embodiment, the angle is somewhat greater or smaller than 90°.

Figure 6:
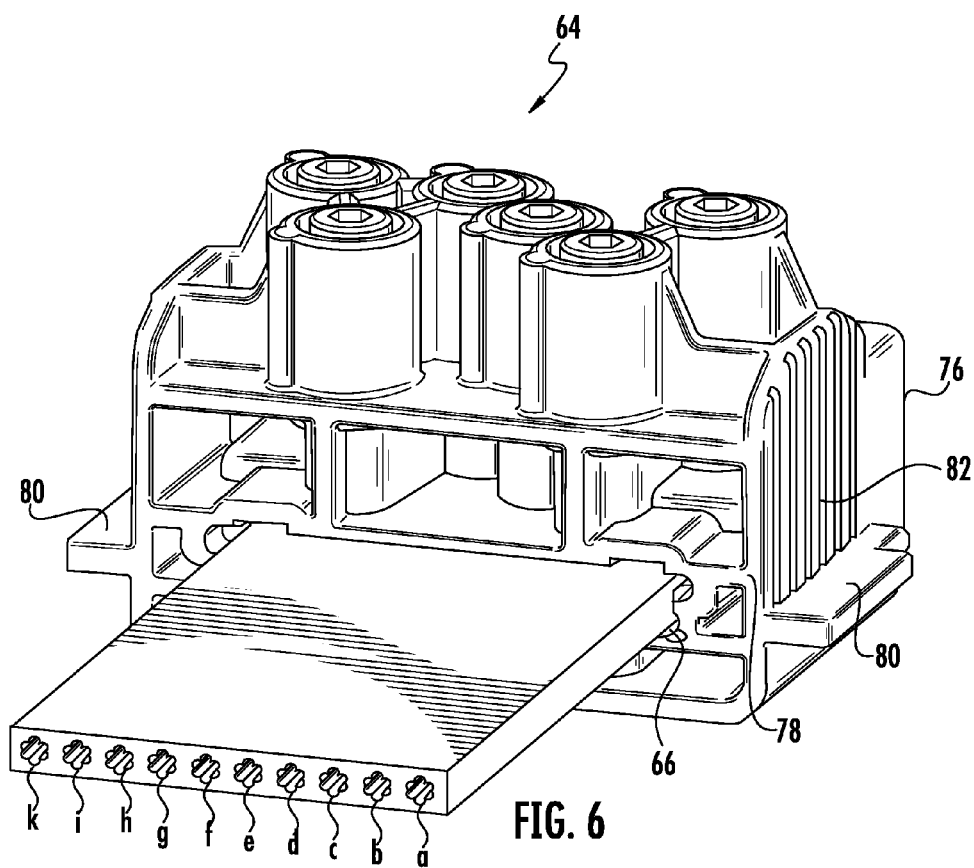
FIG. 6 is a perspective view and illustrates a connecting device of a type designated "second connecting device" in the present application.
Figure 7:
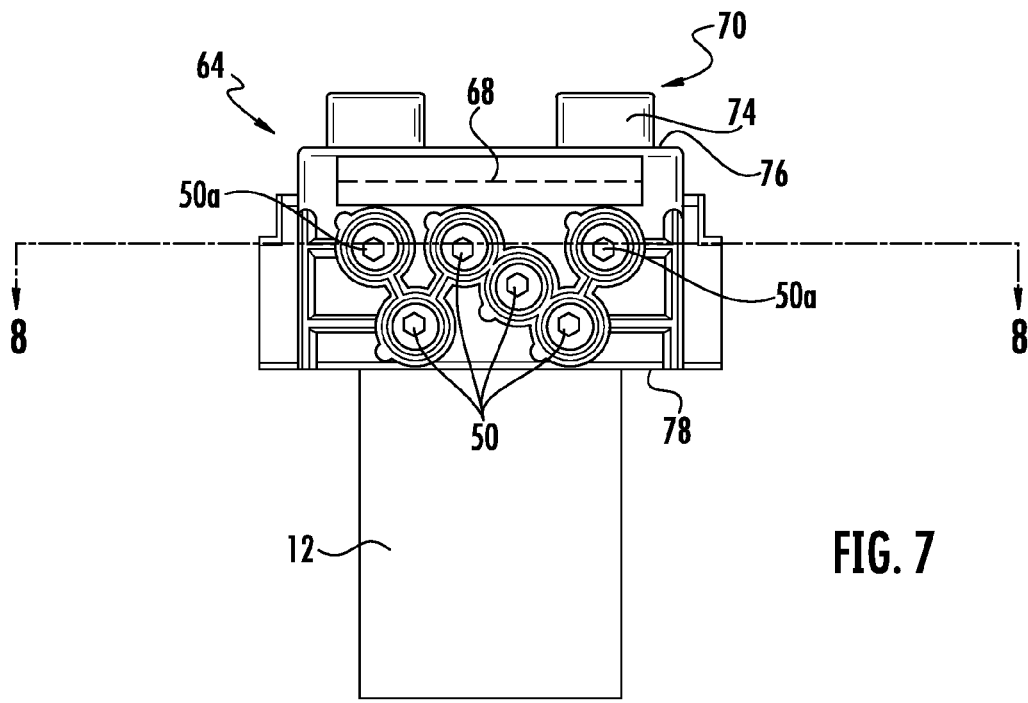
FIG. 7 is a plan view of the connecting device shown in FIG. 6.
Figure 10:
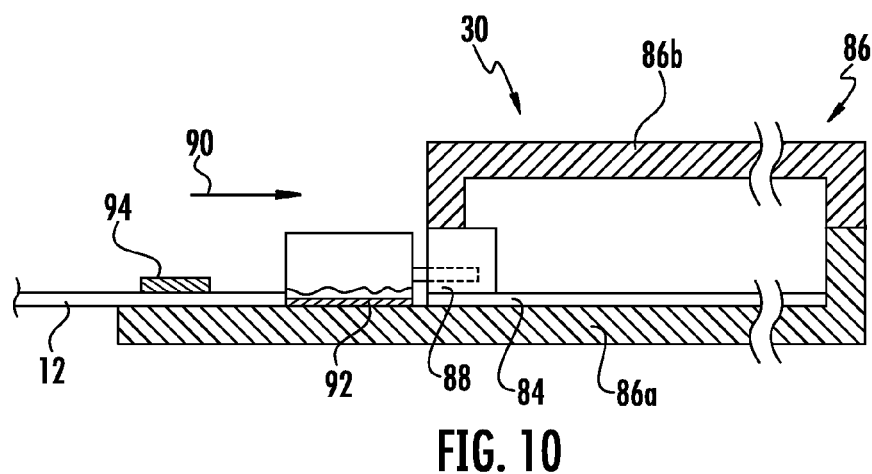
FIG. 10 is an elevation view and illustrates schematically a situation where the second connecting device of FIGS. 6 to 9 has been assembled with a belt monitoring unit.

As best be seen in FIG. 1, the "free" end section of the belt 12 (which exits from the second termination device 16 and is not under tensional load from the car 4 and the counterweight 6) is long enough to extend to the belt monitoring unit 30. The first-mentioned end section exiting from the second termination device 16 has its final end portion inserted into the second connecting device 64, as shown in FIGS. 6 and 7. After the screws 50 and 50a have been screwed into their in-use position, the second connecting device is plugged into the belt monitoring unit 30. FIG. 10 illustrates that the belt monitoring unit 30 comprises a printed circuit board 84 and a housing 86 comprising a lower housing part 86a and an upper housing part 86b. In the housing 86 a connecting device 88 is provided which is fixed to the lower housing part 86a and/or the printed circuit board 84 and electrically connected to leads on the printed circuit board 84. The second connecting unit 64 has been pushed in the direction of the arrow 90, such that the second portions 74 of the conductive elements 70 are inserted into female connectors in the connecting device 88. The bottom wall of the second connecting device 64 comprises rectangular openings 92, into which projections provided at the lower housing part 86a snap in, in order to provide for a preliminary fixation of the second connecting device 64 to the housing 86. The final fixation of the second connecting device 64 to the belt monitoring unit 30 has thereafter been made by a bracket 94, fixed to the lower housing part 86a by screws 96 positioned in front of and behind the drawing plane. The bracket 94 is located in close proximity to or even touching the second connecting device 64. The bracket 94 presses on the belt and provides "strain relieve", i.e. tensional forces exerted to the end section of the belt 12 are not transmitted to the second connecting device 64. The bracket 94 further has the function to directly hold the second connecting device 64 in place.

The ribs 80 shown in FIGS. 6 to 9 of the second connecting device 64 each are positioned in a corresponding groove provided at the lower housing part 86b. In an alternative embodiment, the lower face and/or the upper face of each rib engages a rib provided at the lower housing part 86b. Thus, the ribs 80 serve to ensure a proper positioning of the second connecting device 64 on the lower housing part 86b and serve as a (further) instrument to prevent unintentional movement of the second connecting device 64 in the counter-direction of arrow 90.

The belt monitoring unit 30 is connected to a voltage source and comprises the circuitry, from which electrical signals are fed into one of the conductive elements 70. As it is evident from the drawings and the description hereinbefore, all the cords a through k are connected in a single series connection. The response to the signals fed into one of the conductive elements 70 is outputted from the other conductive element 70 into the circuitry on the printed circuit board 84. The response signals are evaluated. A distinction of significance to the inputted signal or a distinction of significance to a model response signal stored in the belt monitoring unit 30, shows that there was some degree of wear at at least one location of the entirety of cords 42. The belt monitoring unit 30 may comprise circuitry and/or software to distinguish between a tolerable degree of wear and not-tolerable degree of wear.

In an alternative embodiment, each of the second portions 74 is configured as a female connector and each connector device 88 is configured as a male connector.

In the embodiment described hereinbefore, all the ten cords 42 are connected in one single series connection. Other embodiments are possible, for example providing a first group of cords a, b, c, d, which are connected in a first series connection, and a second group of cords e, f, g, h, i, k, which are connected in a second series connection. Four non-bridge type screws 50a and four conductive elements would be provided. The belt monitoring unit 30 would be designed to monitor each of the two series connections for wear of the cords 42 therein. In another embodiment, the number of cords 42 and the number of cord contacting elements are greater or smaller than in the illustrated embodiment.

In an alternative embodiment, the cord contacting elements 50, 50a are not all positioned on one side of the belt 12 (as it was the case in FIGS. 2 to 9), but part of them in a connecting device are positioned at one side of the belt 12, whereas the remainder of them in the connecting device are positioned at the opposite side of the belt 12. It is possible, especially in such an embodiment, to arrange the cord contacting elements all in one single row.

In an alternative embodiment, the bores 58 are designed differently from the drawings and the description given hereinbefore. One option is not to form female screw threads in the second and third sections of the respective bore 58, but to design the bore arrangement as a template for inserting cord contacting elements at proper locations into the belt 12. In this case, the cord contacting elements could be screws (this time not in threaded engagement with the wall of the bore 58) screwed into the belt 12 or even nail-type elements pushed into the belt by a caliper-like instrument.

Belt monitoring units which input signals to cords in an elevator system belt and evaluate the response signals for wear of the belt, are known in the art, for example WO 2005/095252 A1 and WO 2005/094248 A2. Belt monitoring units of such design are suitable to be used in connection with the invention, and belt monitoring units of other design may also be used.

A further subject-matter of the invention is a connecting device per se as disclosed in the present application. The connecting device is configured to be attached to a belt (having cords embedded in a coating material) configured to be used in an elevator system. The connecting device comprises cord contacting elements, screws in one embodiment. Each of the cord contacting elements may be either positioned and designed as a bridge type cord contacting element, or positioned and designed as a non-bridge type cord contacting element which provides electrical connection to only one cord. In the embodiment referred to in this paragraph of the application, one or plural bridge type cord contacting element(s) is/are not an obligatory feature of the invention. This embodiment may comprise one or more other features disclosed in the present application. The embodiment may be such that individual cords, or individual cord pairs, or any multiple of cords, or any multiple of cord pairs are connected to the belt monitoring unit 30 and monitored either individually or in groups of more than one cord.

The invention claimed is:

1. An assembly comprising:
   (a) a belt, which includes cords extending lengthwise of the belt with spaces therebetween, and includes a coating of the cords extending into spaces between the cords, said belt being configured for use in an elevator system as a suspension belt for a car and a counterweight, or being configured for use in the elevator system as a drive belt for the car or for the counterweight, or being configured for use in the elevator system as a combined suspension and drive belt for the car and the counterweight;
   (b) a first connecting device including a first number of cord contacting elements providing electrical connections contacting element-to-cord; and
   (c) a second connecting device, including a second number of cord contacting elements providing electrical connections contacting element-to-cord, and including at least two conductive elements, each conductive element being electrically connected to a respective one of the second cord contacting elements, the conductive elements being provided for making electrical connections to a belt monitoring unit which monitors the proper condition of the cords on the basis of electrical signals passed through the cords;
   (d) wherein at least one of the first and second connecting devices includes at least one bridge type cord contacting element, which extends into a gap between two cords of the cords and provides physical and electrical connection to both of the two cords, thereby electrically connecting the two cords.

2. The assembly of claim 1,
   wherein said at least one bridge type cord contacting element is a screw having a shank portion engaging a wall of a bore in one of the first connecting device and second connecting device, and having an end portion where the cross-sectional area of the screw is gradually reduced.

3. The assembly of claim 2,
   wherein at least part of the end portion has a male screw thread.

4. The assembly of claim 2,
   wherein said wall of said bore has a female screw thread, formed by the screw turned for mounting the same to the connecting device.

5. The assembly of claim 2,
   wherein said bore has at least two sections with a gap therebetween, and wherein a section of said belt is located in said gap.

6. The assembly of claim 1,
   wherein at least one of said conductive elements is penetrated by a screw pin, providing electrical connection with only one cord.

7. The assembly of claim 6,
   wherein said screw pin has a shank portion engaging a wall of a bore in the connecting device, and has an end portion where the cross-sectional area of the screw pin is gradually reduced, wherein said screw pin is positioned in the connecting device such that it penetrates the respective cord substantially in a central portion of its width.

8. The assembly of claim 1,
   wherein both the first and second connecting devices each include plural bridge type cord contacting elements.

9. The assembly of claim 8,
   wherein a number of cords in the belt is 2n, a number of bridge type cord contacting elements in the first connecting device is n, a number of bridge type cord contacting elements in the second connecting device is n−1, and a number of conductive elements in the second connecting device is 2, wherein all the cords in the belt are connected in an electrical series connection and wherein said assembly is configured such that it is possible to make the electrical connections between the assembly and said belt monitoring unit via the second connecting device only.

10. The assembly of claim 1,
    wherein said assembly is electrically connected to said belt monitoring unit, which comprises a housing, a printed circuit board, and a connector electrically connected to the printed circuit board; and
    wherein said second connecting device is electrically connected by plug in connection to said connector.

11. The assembly of claim 10,
    wherein a belt section adjacent to the second connecting device is fixed to said housing by means of a fixation bracket.

12. A method of mounting a connecting device to a belt, which includes cords extending lengthwise of the belt with spaces therebetween and includes a coating of the cords extending into the spaces between the cords, said belt being configured for use in an elevator system as a suspension belt for a car and a counterweight, or being configured for use in the elevator system as a drive belt for the car or for the counterweight, or being configured for use in the elevator system as a combined suspension and drive belt for the car and the counterweight;
    wherein said connecting device includes a slot that either extends as an open passage through the connecting device, or has, in one end portion thereof, a stop portion for the belt associated to the slot; and wherein said connecting device includes a bore and a screw engaging a wall of the bore, the bore having an axis that traverses the slot;

said method comprising placing a section of said belt in said slot and turning said screw, whereby a portion of the screw is urged into one of the spaces between two cords of the cords and into physical contact with the two cords, thereby providing an electrical connection between the two cords.

13. The method of claim 12, wherein the connecting device includes a first connecting device having plural first screws, whereby portions of each of said first screws provide an electrical connection between a respective pair of cords;

and wherein the connecting device includes a second connecting device having plural first screws and two second screws, whereby portions of each of said first screws provide an electrical connection between a respective pair of cords and portions of each of said second screws provide an electrical connection between only one cord and the second screw.

14. The method of claim 13, wherein electrical connections are made between said second screws and a belt monitoring unit, thereby establishing a circuit which includes all the cords in an electrical series connection and a component of the belt monitoring unit.

\* \* \* \* \*